(12) United States Patent
Huang et al.

(10) Patent No.: US 8,943,079 B2
(45) Date of Patent: Jan. 27, 2015

(54) APPARATUS AND METHODS FOR ANONYMIZING A DATA SET

(75) Inventors: Vincent Huang, Sollentuna (SE); Xiaoqiang Chen, Gothenburg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 403 days.

(21) Appl. No.: 13/363,688

(22) Filed: Feb. 1, 2012

(65) Prior Publication Data

US 2013/0198188 A1  Aug. 1, 2013

(51) Int. Cl.
*G06F 7/00* (2006.01)
*G06F 17/30* (2006.01)

(52) U.S. Cl.
USPC .......................................... 707/757; 707/737

(58) Field of Classification Search
USPC ................................................. 707/757, 737
See application file for complete search history.

(56) References Cited

U.S. PATENT DOCUMENTS

| | | | | |
|---|---|---|---|---|
| 7,877,398 B2 * | 1/2011 | Kroeschel et al. | ............ | 707/757 |
| 8,326,849 B2 * | 12/2012 | El Emam et al. | ............. | 707/756 |
| 8,626,697 B1 * | 1/2014 | Chaine et al. | ................... | 706/50 |
| 2002/0099824 A1 * | 7/2002 | Bender et al. | ................. | 709/225 |
| 2002/0169793 A1 * | 11/2002 | Sweeney | ........................ | 707/204 |
| 2003/0220927 A1 * | 11/2003 | Iverson et al. | .................. | 707/100 |
| 2004/0186846 A1 * | 9/2004 | Birdwell et al. | ............... | 707/101 |
| 2005/0114382 A1 * | 5/2005 | Lakshminarayan et al. | .. | 707/102 |
| 2006/0123461 A1 * | 6/2006 | Lunt et al. | .......................... | 726/1 |
| 2007/0055482 A1 * | 3/2007 | Goodermote et al. | ......... | 702/184 |
| 2007/0185737 A1 * | 8/2007 | Friedlander et al. | .............. | 705/3 |
| 2007/0233711 A1 * | 10/2007 | Aggarwal et al. | ............. | 707/100 |
| 2008/0010304 A1 * | 1/2008 | Vempala et al. | .............. | 707/100 |

* cited by examiner

*Primary Examiner* — Charles Lu

(74) *Attorney, Agent, or Firm* — Rothwell, Figg, Ernst & Manbeck P.C.

(57) ABSTRACT

Methods and systems are disclosed for anonymizing a dataset that correlates a set of entities with respective attributes. The method comprises determine clusters of similar entities. Determining the clusters comprises (1) partitioning the entities into a first group with similar attributes to one another and a complement group of entities with similar attributes to one another and (2) recursively repeating the partitioning on the groups until every group meets one or more criteria. The partitioning a group comprises choosing a reference entity from the group, determining a symmetric set of attributes based on the reference entity attributes and on an average of the group's attributes, and assigning each entity to the first or second group depending on whether its attributes are more similar to those of the reference user or to those of the symmetric set.

17 Claims, 12 Drawing Sheets

APPARATUS AND METHODS FOR ANONYMIZING A DATA SET

TECHNICAL FIELD

Embodiments relate to apparatuses and methods for anonymizing a data set.

BACKGROUND

Today, governments and corporations collect massive amounts of data about people. Such "user data" can be mined for insights or used to create useful computer systems, such as recommendation engines. For example, e-commerce sites often track a user's shopping history and analyze it to recommend new products in which the user may be interested. Similarly, online movie streaming applications may track a user's viewing history and/or self-reported ratings to suggest additional movies that the user may be interested in viewing.

As the amount of valuable data being collected has increased, so has the demand for exchange of such information. For example, the Netflix™ online DVD rental service recently published a user dataset of 100M ratings of over 17K movies by 500K entities and offered a cash prize for new algorithms for mining that data. The release of user data to the public or among private parties is inevitable given the value and uses of such data.

Given the trend towards release of user data, user privacy has become an important concern. Users are made uncomfortable by the prospect of having so much of their personal information being shared with various, often unidentified, third parties.

Privacy preserving data publishing (PPDP) is a field of research that focuses on manipulating a user dataset to create greater user anonymity while still maintaining the value of the dataset. Using PPDP techniques, a data publisher might "anonymize" a dataset and release the anonymized dataset to a third party rather than the original data set. Thus, the recipient of the data may be able to use the data for meaningful data mining activities but cannot learn particularly private information about each user.

Various PPDP techniques have been developed. For example, one simple technique is to replace entities' names with anonymous identifiers (e.g., random numbers) or to remove such names altogether. More complex techniques may be aimed at preventing malicious actors from reverse-engineering personal user information from the data when considered as a whole. Such techniques include approaches such as perturbation and k-anonymity.

In perturbation, the data values themselves are perturbed such that some data would be masked while other properties preserved. Perturbation techniques that have been studied include randomization, rotation perturbation, geometric perturbation, and others.

In k-anonymity, attempts to protect data by constructing groups of anonymous records, such that every tuple in the original user data is indistinguishably related to no fewer than k users. Although several algorithms have been proposed for finding optimal (i.e., minimal) k-anonymous tables, the application of those algorithms is limited in practice because the k-anonymity problem is NP-hard (Non-deterministic polynomial-time hard). Nevertheless, various approximation algorithms and heuristics have emerged.

SUMMARY

A method is disclosed for anonymizing a dataset that correlates a set of entities with respective attributes. The method comprises identifying clusters of similar entities. Identifying the clusters comprises (1) partitioning the entities into a first group with similar attributes to one another and a complement group of entities with similar attributes to one another and (2) recursively repeating the partitioning on the groups until every group meets one or more criteria (e.g., a size range). The partitioning a group comprises choosing a reference entity from the group, determining a symmetric set of attributes based on the reference entity attributes and on an average of the group's attributes, and assigning each entity to the first or second group depending on whether it's attributes are more similar to those of the reference user or to those of the symmetric set.

In some embodiments, the method may comprise creating an anonymous version of the dataset by (1) calculating, for one of the clusters of similar entities, an anonymous value for a given attribute; and (2) assigning the anonymous value of the attribute to each entity in the cluster.

In some embodiments, before identifying the clusters, the dataset may be processed to reduce dimensionality or sparseness. The processing may comprise performing a singular-value decomposition (SVD) on the dataset. In some embodiments, the processing may comprise factoring a matrix containing the entity data into a diagonal matrix of singular values, setting the singular values in descending order, and choosing the r most significant singular values with which to identify the clusters.

In some embodiments, the clustering may be dependent on a per-entity privacy policy indicating, for a given entity, a minimum size of a cluster to which the entity may be assigned. Therefore, in some embodiments, the minimum size for a given group may be dependent on one or more per-entity privacy policies associated with one or more entities in the group.

In some embodiments, the method may comprise determining whether a number of entities in a given group is between two and three times the minimum threshold and if so, dividing the given group into two clusters, where the number of entities in each of the two clusters meets the minimum threshold.

In some embodiments, the method may comprise determining that the number of entities in an under-populated group is below a minimum threshold, and in response, growing the under-populated group by reassigning, to the under-populated group, one or more entities from the under-populated group's complement group until the number of entities in the under-populated group meets the minimum threshold. In some embodiments, growing the under-populated group may comprise identifying an entity in the complement group whose attributes are most similar to those of the under-populated group, reassigning the identified entity from the complement group to the under-populated group, and repeating the determining and assigning until the number of entities in the under-populated group meets the minimum threshold.

In some embodiments, identifying the clusters of entities may further comprise determining, based on respective privacy policies of the entities, that no entity in a given group requires anonymity. In response to determining that no entity in the given group requires anonymity, the system may place one or more of such entities in a separate, one-entity cluster.

In some embodiments, the method may comprise determining that a given group includes more entities than a given threshold and in response, identifying an entity in the group that does not require privacy and creating a separate one-entity cluster for that entity.

A computer readable storage medium is also disclosed. The medium stores program instructions executable by a computer to determine clusters of similar entities from a set of entities. Determining the clusters comprises (1) partitioning the entities into a first group with similar attributes to one another and a complement group of entities with similar attributes to one another and (2) recursively repeating the partitioning on the groups until every group meets one or more size criteria (e.g., a size range). The partitioning a group comprises choosing a reference entity from the group, determining a symmetric set of attributes based on the reference entity attributes and on an average of the group's attributes, and assigning each entity to the first or second group depending on whether it's attributes are more similar to those of the reference user or to those of the symmetric set.

An apparatus is disclosed comprising a processor and a memory coupled to the processor. The memory stores program instructions executable by the processor to determine clusters of similar entities from a set of entities. Determining the clusters comprises (1) partitioning the entities into a first group with similar attributes to one another and a complement group of entities with similar attributes to one another and (2) recursively repeating the partitioning on the groups until every group meets one or more size criteria (e.g., a size range). The partitioning a group comprises choosing a reference entity from the group, determining a symmetric set of attributes based on the reference entity attributes and on an average of the group's attributes, and assigning each entity to the first or second group depending on whether it's attributes are more similar to those of the reference user or to those of the symmetric set.

BRIEF DESCRIPTION OF THE DRAWINGS

The accompanying drawings, which are incorporated herein and part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
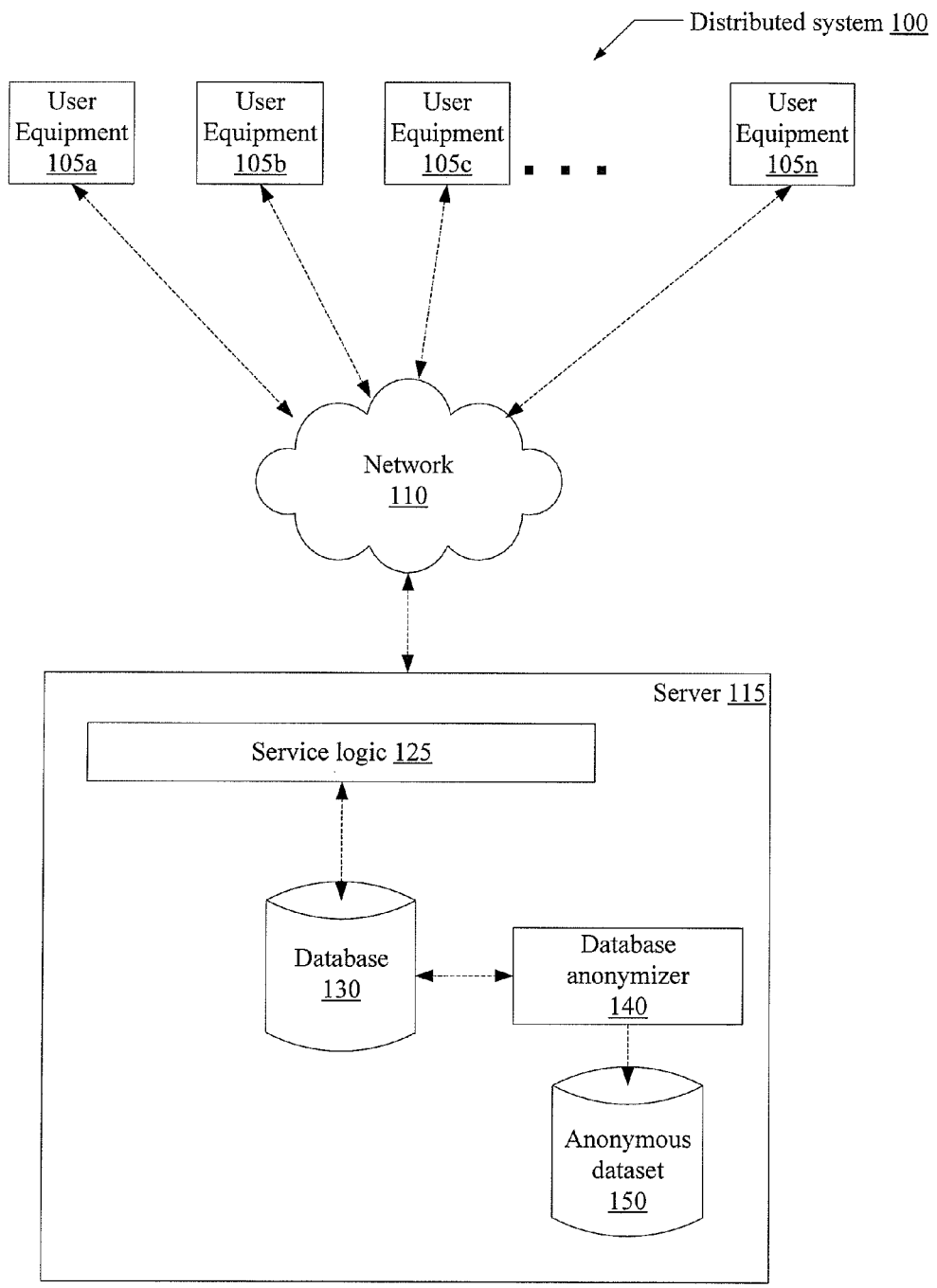
FIG. 1 is a system diagram illustrating a client/server system for gathering and anonymizing user data, according to some embodiments.

It is often desirable to anonymize information in a dataset before it is released. For example, users may be uncomfortable when their personally identifiable information (e.g., preferences, personal attributes, etc.) are included in a dataset that is released to a third party. To avoid violating user privacy, a dataset may be preprocessed with a k-anonymity algorithm that ensures that every user in the dataset is indistinguishable from at least k−1 other users.

Consider an example of a movie preferences dataset. The dataset may include information on a plurality of users and movie preferences for each user. Before the dataset is released to a third party, the dataset owner may anonymize the dataset by performing a k-anonymity algorithm that modifies each user's preferences such that the user's preferences are identical to those of at least k−1 other users. Thus, a third party that receives the processed dataset may not be able to learn a particular user's personal preferences but may still be able to mine the dataset for valuable insights.

Although many of the embodiments described herein concern datasets of user preferences, one skilled in the art given the benefit of this disclosure will recognize that the techniques described herein are generally applicable to any dataset that describes entities (e.g., users) and attributes (e.g., preferences) of those entities. It is intended that the claims of this disclosure be understood to encompass all such entity/attribute datasets.

One category of k-anonymity algorithms is clustering-based k-anonymity (hereinafter "k-clustering"). In k-clustering approaches, the database is first partitioned into "clusters" of similar users, where each cluster has at least k users. A cluster of users is similar because the members of the cluster have similar attributes (e.g., preferences). Once the users are decomposed into clusters, the attributes of each user is anonymized with respect to the attributes of all other users in the cluster. For example, each user in a given cluster may be assigned the same attributes as every other (e.g., same values for one or more attributes). The process of assigning a cluster of users the same attributes may be referred to herein generally as "feature extraction."

An important challenge for implementing k-clustering is the problem of identifying clusters of users. If users in each cluster have highly similar attributes, then the dataset may be effectively anonymized while still maintaining its value (e.g., for effective data mining). However, if the users are dissimilar, then the anonymized dataset may be less true to the original and therefore less valuable.

Unfortunately, identifying clusters of similar users is a difficult and time-consuming process. The problem itself is known to be NP-hard, and therefore, more effective heuristics must be developed to facilitate clustering-based k-anonymity techniques.

According to various embodiments, new k-clustering techniques for anonymizing a database are enabled. In some embodiments, a computer may identify a cluster of similar entities in a data set by performing a recursive partitioning algorithm. For example, the computer may partition a set of users into a first group and a second group by (1) choosing a reference user from the set; (2) determining a symmetric set of attributes based on the reference user's attributes and on an average of the attributes of the set of users; and (3) assigning each user to the first or second group depending on whether the attributes of the user are more similar to the reference user's attributes or to the symmetric set of attributes. The computer may then recursively repeat the partitioning process on the first and second groups to create further groups. The recursive process may stop when every group meets one or more criteria (e.g., is smaller than a maximum threshold). In various embodiments, any criteria may be used to determine whether a group is appropriate for anonymization, including one of or any combination of: a minimum size, maximum size, a maximum variance between members, per-member privacy policy requirements, and/or others.

In some embodiments, the recursive clustering algorithm may be used to implement a k-clustering algorithm. For example, each group resulting from the recursive partitioning may be designated as a cluster. Accordingly, each group may be anonymized by assigning the users of that group identical attributes (i.e., "feature extraction"). For example, for each common attribute, the computer may calculate an average value for the group and assign each user the average value. Thus, the disclosed techniques may be used to implement a k-clustering algorithm for anonymizing a dataset.

In some embodiments, if the dataset is very sparse, as is common with user preference datasets (e.g., movie preferences datasets), the anonymization technique may include preprocessing the sparse dataset to produce a denser dataset. For example, the computer may create a denser dataset by performing a singular-value decomposition of the original (sparse) dataset before performing the k-anonymity algorithm described above. Thus, a technique for anonymizing a sparse database, according to some embodiments, may include (1) preprocessing the dataset to produce a denser dataset, (2) identifying clusters of similar users within the denser dataset; and (3) extracting features from the identified clusters of users.

FIG. 1 is a system diagram illustrating a client/server system for gathering and anonymizing user data, according to some embodiments. In FIG. 1, distributed system 100 comprises multiple user equipment 105a-105n in communication with a server 115 over a network 110.

In various embodiments, network 110 may correspond to any one or more communication networks. Network 110 may therefore include any radio network, packet switched network (e.g., Internet, local Ethernet, etc.), local interconnect, or any other communication network capable of carrying messages from user equipment 105 to server 115.

In various embodiments, user equipment 105 may report attributes (e.g., user preferences) for a particular user or a particular set of users to server 115. Each user equipment 105 may correspond to one or more different machines (e.g., personal computer, mobile device, etc.), which may represent one or more different user accounts, or any other entity for which attributes can be recorded. For example, each user equipment 105 may correspond to a video-on-demand (VOD) account associated with a given user.

Server 115 includes service logic 125 for receiving user attributes from user equipment 105. For example, for a VOD service, user equipment 105 may communicate one or more users' movie ratings or other video preferences to server 115. Server 115 utilizes service logic 125 to receive user attributes (e.g., preferences) and to record them in database 130. Database 130 may be implemented using any database technology, such as relational database, flat file(s), hierarchical database, and/or other formats.

According to the illustrated embodiment, distributed system 100 includes database anonymizer 140. Anonymizer 140 may be implemented in software and/or hardware and be configured to perform dataset anonymization techniques, as described herein. For example, database anonymizer 140 may be configured to perform a clustering-based k-anonymity algorithm, such as method 400 of FIG. 4, to create anonymous dataset 150. Anonymous dataset 150 may be stored in persistent storage, in memory, on another machine, in any other location where it may be transmitted to and/or otherwise shared with third parties.

Although service logic 125, database 130, anonymizer 140, and dataset 150 are all illustrated as being part of server 115, it should be recognized that, in various embodiments, any of these components may be implemented on a separate physical and/or virtual computers. Furthermore, any individual component (e.g., anonymizer 140), may be implemented on separate physical and/or virtual machines such that various methods described herein may be implemented collaboratively (e.g., by a cluster, by a distributed system, etc.). In such embodiments, the separate computers may be connected to one another using one or more networks to facilitate communication and collaboration.

Figure 2:
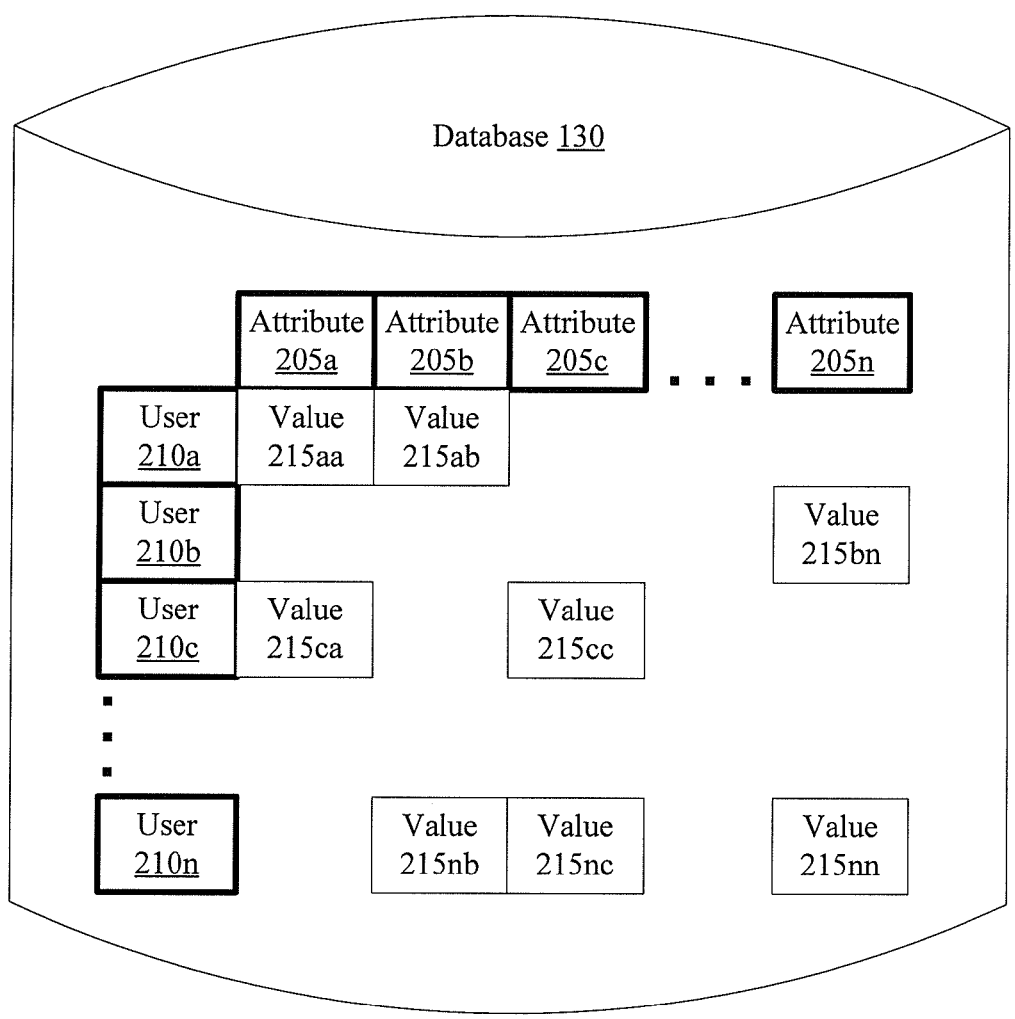
FIG. 2 is a block diagram illustrating data stored in a user attribute database, according to some embodiments.

FIG. 2 is a block diagram illustrating data stored in a user attribute database, according to some embodiments. Database 130 of FIG. 2 may correspond to database 130 of FIG. 1.

According to the illustrated embodiment, database 130 stores a sparsely populated matrix of user attribute values. The data in database 130 is illustrated as a collection of records (horizontal rows), each corresponding to a respective user (e.g., user accounts on user equipment 105a-105n of FIG. 1). Each user record may include values for various attributes 205 (represented as vertical columns). For example, in a movie preferences database, the database may have a row for each subscriber (user) and a column for each movie (attribute). In such a database, a value in row x and column y (value$_{xy}$) may indicate user x has rated movie y with value$_{xy}$.

Although the data in database 130 is illustrated in terms of users and attributes, it should be recognized that the techniques described herein are appropriate for any database of entity/attribute pairings. Moreover, the matrix need not be limited to only two dimensions. In various embodiments, database 130 may store data in any number of dimensions (e.g., n-tuples).

User preference databases often have very high dimensionality (e.g., large n in database 130). For instance, if database 130 is a movie preferences database, it may include a separate column (i.e., attribute) for every movie ever made and a separate row for every user in the system. The high dimensionality of such databases may cause traditional k-clustering algorithms to execute very slowly.

It is observed here that user preference databases are often sparsely populated. For example, a movie rating database may include an attribute (column in database 130) for every movie, but a user (row in database 130) may rate only a small portion of those movies. In database 130, for example, user 210b has no value for attributes 205a-205c. Therefore, data in a user preferences database may be sparse.

Because the high-dimensionality of user preference databases makes k-clustering algorithms slow, in some embodiments, a sparse database may first be pre-processed to produce a denser, lower-dimensionality dataset. Then, a k-clustering algorithm may be performed on the lower-dimensionality dataset to anonymize the database. For example, in some embodiments, the preprocessing may include performing a singular-value decomposition on the data, which may be filtered (e.g., factor the data matrix into a diagonal matrix of singular values, set the singular values in descending order, and choose the r most significant singular values to include in the pre-processed data set).

Figure 3:
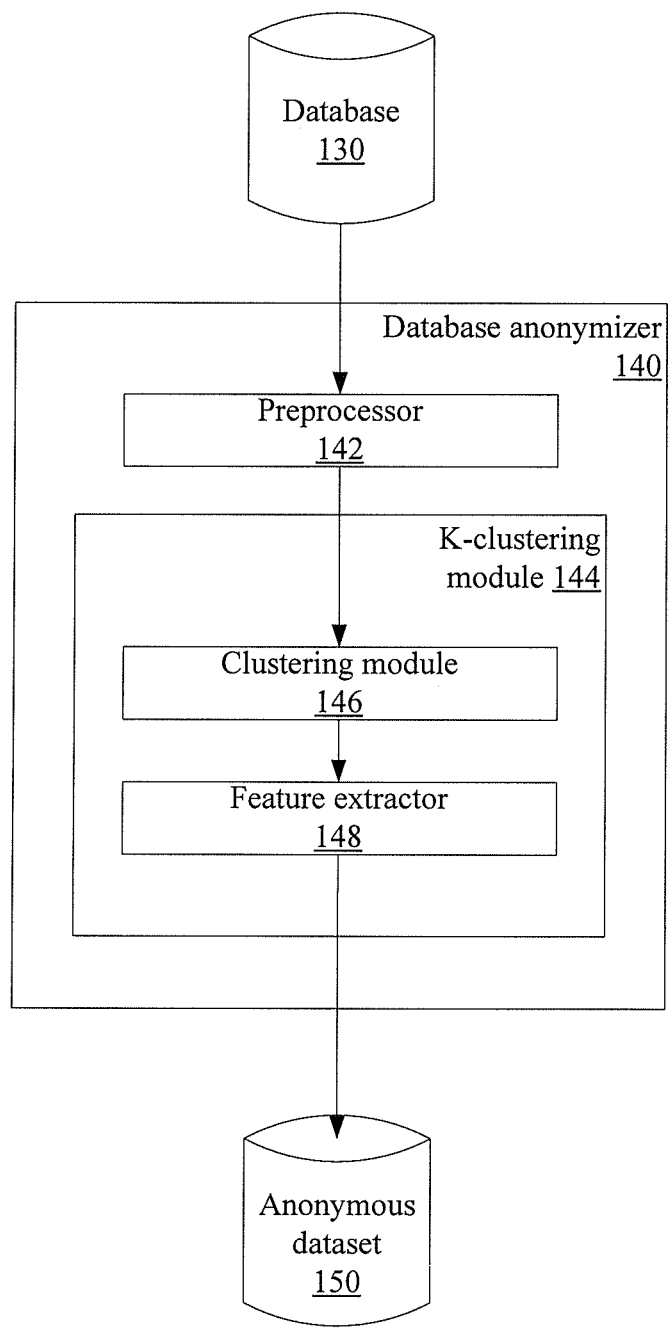
FIG. 3 is a block diagram illustrating the components of a database anonymizer according to some embodiments.

FIG. 3 is a block diagram illustrating the components of a database anonymizer according to some embodiments. In some embodiments, anonymizer 140 of FIG. 3 may correspond to anonymizer 140 of FIG. 1. Accordingly, anonymizer 140 takes as input data from database 130 and uses it to produce anonymous dataset 150.

In the illustrated embodiment, database anonymizer 140 includes a pre-processor 142 for reducing the sparseness of database 130 to produce a lower-dimensionality dataset. Preprocessor 142 may be configured to reduce the sparseness by performing various pre-processing algorithms (e.g., singular-value decomposition), as described in detail herein (e.g., see discussion of FIG. 5).

Database anonymizer 144 also includes a k-clustering module 144 configured to perform a k-clustering algorithm on the pre-processed dataset and to thereby produce anonymous dataset 150. In the illustrated embodiment, k-clustering module 144 includes clustering module 146 and a feature extractor 148. Clustering module 146 may be configured to perform the clustering portion of the k-clustering algorithm by clustering similar database entities (e.g., users), according to various techniques described herein (e.g., see discussion of FIGS. 6-9). Feature extractor 148 may be configured to perform the feature extraction portion of the k-clustering algorithm by anonymizing the users in each cluster with respect to one another, according to various techniques described herein (e.g., see discussion of FIG. 10).

Although various modules 142-148 are illustrated separately in FIG. 3, in various embodiments, different ones of the modules may be combined or decomposed further. Any of modules 142-148 may be implemented in or with the help of software, hardware, or a combination thereof.

Figure 4:
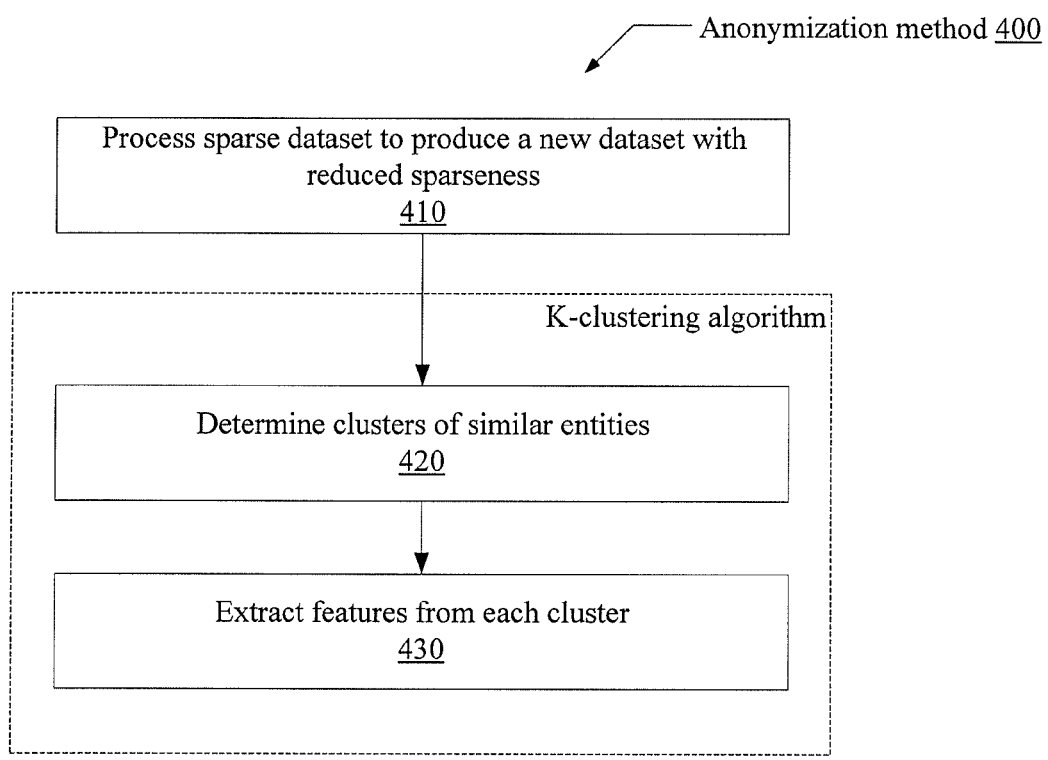
FIG. 4 is a flow diagram illustrating a method for anonymizing a data set, according to some embodiments.

FIG. 4 is a flow diagram illustrating a method for anonymizing a data set, according to some embodiments. Method 400 of FIG. 4 may be performed by a database anonymizer, such as anonymizer 140 of FIGS. 1 and 3.

According to the illustrated embodiment, anonymization method 400 begins by optionally processing a sparse dataset to produce a new dataset with reduced sparseness, as in 410. Step 410 may be performed by a preprocessing module, such as preprocessor 142 of FIG. 3, and may be omitted in some instances, such as when the input dataset is already dense. After the sparse dataset has been preprocessed in 410, the computer may perform a k-clustering algorithm on the pre-processed dataset. As illustrated in method 400, the k-clustering algorithm may comprise determining clusters of similar entities (as in 420) and extracting the features from each cluster, as in 430. Steps 420 and 430 may be performed respectively by clustering module 146 and feature extractor 148 of FIG. 3.

Detailed embodiments of steps 410, 420, and 430 are presented below in relation to FIGS. 5-10. For clarity, the embodiments of FIGS. 5-10 are described in terms of a user movie preference dataset. The example input dataset is an m×n matrix A, representing m users and n movies. A value in A[i][j] represents a rating (e.g., 0-5 stars) of movie j by user i. Although the embodiments of FIGS. 5-10 are described in terms of a movie dataset, as noted previously, the disclosed methods apply equally to any entity/attribute dataset.

Preprocessing

Figure 5:
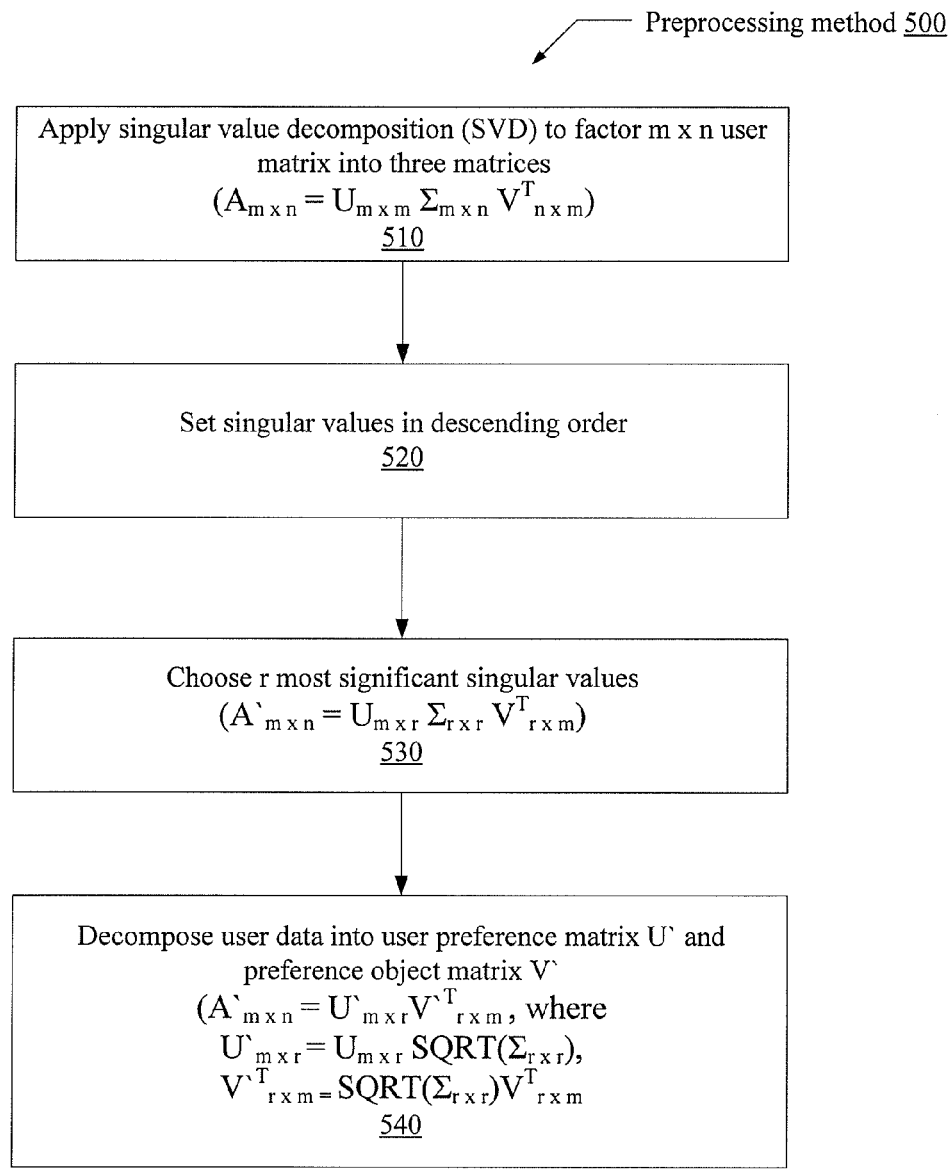
FIG. 5 is a flow diagram illustrating a detailed embodiment of preprocessing a dataset to reduce sparseness, according to some embodiments.

FIG. 5 is a flow diagram illustrating a detailed embodiment of preprocessing a dataset to reduce sparseness, according to some embodiments. Method 500 may correspond to preprocessing step 410 and be performed by preprocessor 142.

A movie preference dataset is often of high dimensionality (many users and movies), but very sparse (each user has rated only a few movies). For example, if each user has rated 100 of 10,000 movies, then 99% of entries of the matrix are empty. Accordingly, it may be inefficient to attempt to perform a k-clustering algorithm directly on such a database. To reduce the dimensionality and improve performance, the database may be pre-processed, such as by method 500.

First, it is observed that similar users are not necessarily those that have rated the same movies, but those who have similar movie preferences. Accordingly, singular value decomposition (SVD) may be used to extract user preference data from the original database, as in 510. SVD is a matrix approximation method that may be used to factor the m x n user matrix into three matrices, such that:

$$A_{m \times n} = U_{m \times m} \Sigma_{m \times n} V^T_{n \times n} \quad \text{Eq. 1:}$$

In Eq. 1, $\Sigma$ corresponds to a diagonal matrix that contains singular values of A. The columns of U and V correspond respectively to left-singular and right-singular vectors for the corresponding singular values. Any method for computing an SVD (many of which are known in the art) may be used to decompose matrix A into matrices U, $\Sigma$, and V.

If the singular values (U, V) are set in descending order (as in 520) and only the r most significant singular values are chosen (as in 530), then SVD outputs a matrix A of rank r with minimum approximation error in terms of least-squares distance from A, that is:

$$A_{m \times n} = U_{m \times r} \Sigma_{r \times r} V^T_{r \times n} \quad \text{Eq. 2:}$$

There is latent meaning behind singular values: singular values may be regarded as implicit "features" of the movies. Therefore, if r is set to 100, then movies are limited to have 100 features, such that each movie is described by 100 values that indicate how much a given movie exemplifies each feature. Likewise, each user may be descried by another 100 values that indicate how much that user prefers each aspect. In such a scenario, rating is simply the summation of product of each feature. In 540, we connect the "features" insight with the matrix terms by transforming Eq. 2 to Eq. 3:

$$A_{m \times n} = U_{m \times r} V^T_{r \times n}, \text{ where}$$

$$U_{m \times r} = U_{m \times r} \text{SQRT}(\Sigma_{r \times r}),$$

$$V^T_{r \times n} = \text{SQRT}(\Sigma_{r \times r}) V^T_{r \times n} \quad \text{Eq. 3:}$$

In Eq. 3, the original matrix has been decomposed into two oblong matrices: V (an n×r movie aspect matrix) and U (an m×r user preference matrix). Therefore, U may be used as the low-dimension dataset on which to perform the k-clustering algorithm. The preprocessing method 500 therefore results in a low-dimension, high-density linear model $U_{m \times r}$ that describes user preferences. Method 500 therefore solves both the sparseness problem (e.g., by extracting user ratings) and the high-dimensionality problem (e.g., method 500 can be expected to reduce the dimensionality of a user preferences dataset, such as movie preferences data set A, by around 100× without considerable loss of accuracy).

After the dataset has been preprocessed, the dataset may be anonymized by executing a k-clustering algorithm on linear model U. As discussed above, a k-clustering algorithm may be broken down into two steps: (1) identifying clusters and (2) extracting features.

Clustering

In the most basic case, it is assumed that each user requires a certain fixed level of privacy. The fixed level of privacy for each user may be guaranteed by ensuring that each user is in a cluster of at least some minimum size k (i.e., at least k users in each cluster). However, to preserve the accuracy of the dataset, it may be desirable (1) that each cluster to be as small as possible without violating the condition that each cluster must have at least k users and (2) that the users in each cluster should be as similar as possible. The problem of identifying a clustering that meets all these requirements with a fixed level of privacy for every user (i.e., size of clusters) is referred to herein as the "fixed k-gather problem."

Figure 6:
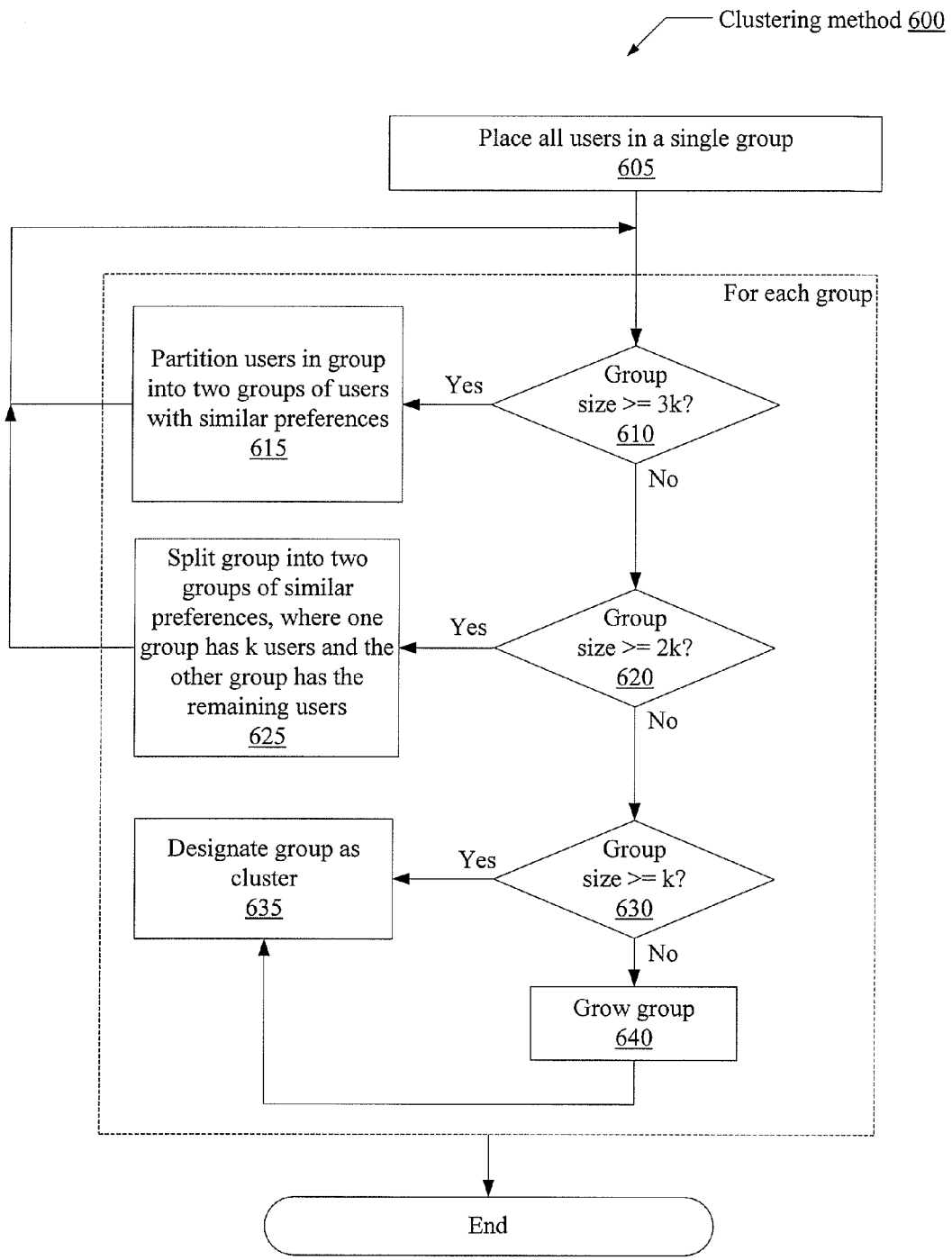
FIG. 6 is a flow diagram illustrating a method for identifying clusters of similar users with fixed privacy preferences, according to some embodiments.

FIG. 6 is a flow diagram illustrating a method for identifying clusters of similar users with fixed privacy preferences, according to some embodiments. Method 600 therefore represents a heuristic method for solving the fixed k-gather problem. Method 600 may correspond to clustering step 420 of FIG. 4 and may be performed by clustering module 146.

Method 600 begins in 605 by placing all users in the dataset into a single "group." As used herein, the term "group" refers to an intermediate grouping of one or more users; a "cluster" is a group that has reached its final membership and is ready to be anonymized via feature extraction.

Steps 610-640 of method 600 represent a recursive method that is applied to the group. Each iteration of the recursive method either bisects the group into two groups and recursively performs the method on each group, or terminates by designating the group as a "cluster." For generality, the recursive nature of the method is represented by the "for each group" idiom noted by the dashed box of FIG. 6. As such, the method of steps 610-640 is repeated on any group that has not been designated a cluster until all users in the dataset are in clusters. The illustrated embodiment is exemplary only and it is recognized that there are many variations for its particular implementation. It is intended that the claims herein cover all such variations.

In decision 610, the system decides whether the group size is greater or equal to 3k (i.e., three times the minimum group size k). If so, as indicated by the affirmative exit from 610, the method partitions the users in the group into two groups of users with similar preferences, as in 615, a detailed embodiment of which is discussed below with respect to FIG. 7. The recursive method may then be applied to the two subgroups, as indicated by the feedback loop from 615 to 610. Because one of the new groups contains a subset of the original group's users and the other new group contains the rest of the original group's users, the two new groups may be considered complements.

If the group size is not greater or equal to 3k, as indicated by the negative exit from 610, the method moves to decision 620. In 620, the system decides whether the group size is greater or equal to 2k (i.e., two times the minimum group size k). If so, as indicated by the affirmative exit from 610, the method splits the group into two groups of similar preferences, as in 625, where one group has k users and the other group has the remaining users (i.e., "complement group"). Thus, the split of 625 results in two groups, one with k users and another with n users, where k<=n<2k. The recursive method may then be applied to the two newly created groups, as indicated by the feedback loop from 625 to 610.

If the group is not of size greater than or equal to 2k, as indicated by the negative exit from 620, the method moves to decision 630. In 630, the system decides whether the group size is greater than or equal to k (i.e., the minimum group size). If the group size is greater or equal to k, as indicated by the affirmative exit from 630, the group is designated as a cluster, as in 635. If the group size is not greater or equal to k, as indicated by the negative exit from 630, then the group is grown, as in 640, until the group is of size k. In 640, a group of size n can be grown by adding the k−n most similar users to the group. Once the group is grown to size k, as in 640, the group is designated a cluster, as in 635.

Method 600 ends when no more groups exist. That is, although step 635 does not include an exit, the method of 610-640 is repeated on every group (e.g., created in 615) that has not been designated as a cluster.

Figure 7:
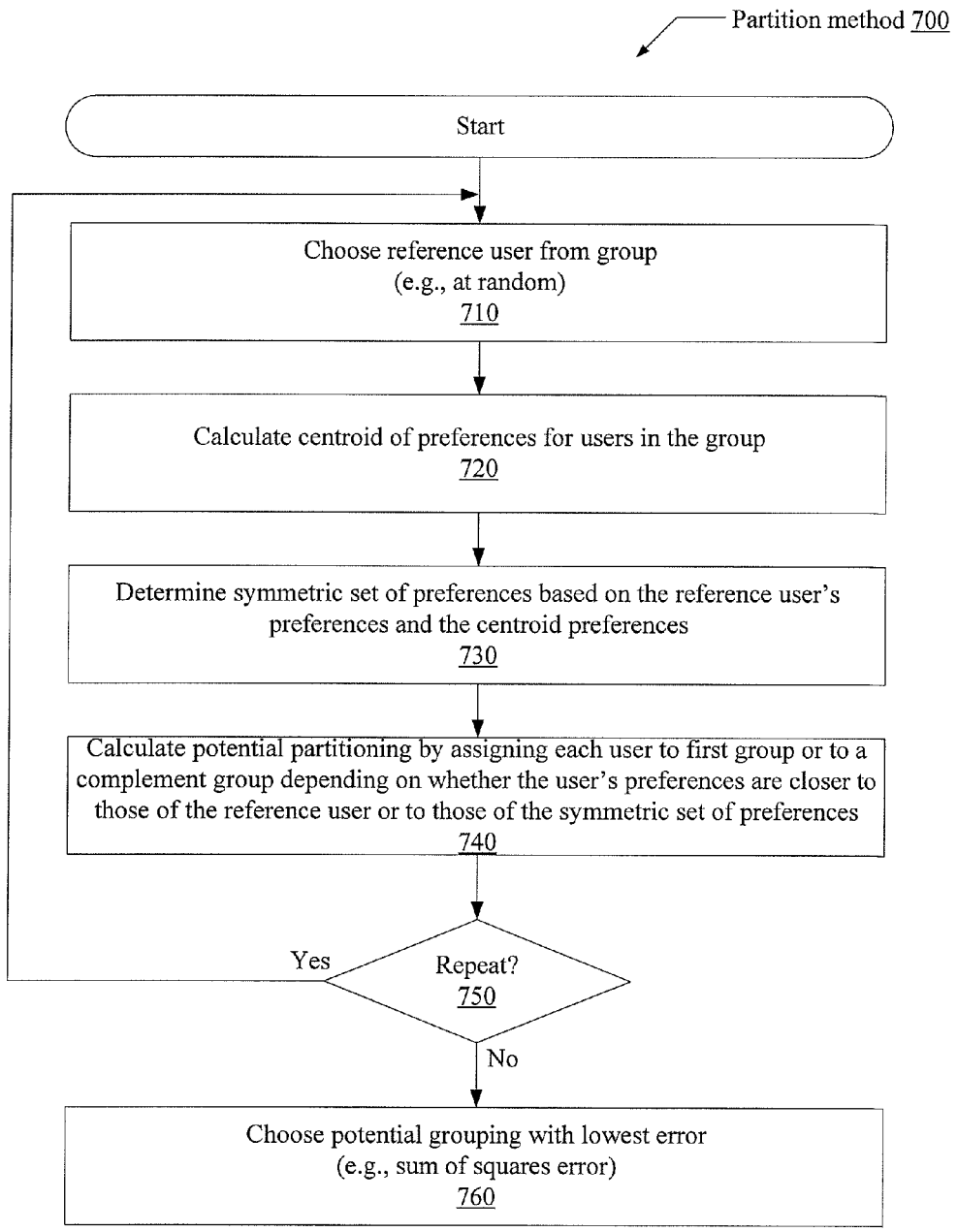
FIG. 7 is a flow diagram illustrating a method for partitioning users in a group into two groups of users with similar preferences, according to some embodiments.

FIG. 7 is a flow diagram illustrating a method 700 for partitioning users in a group into two groups of users with similar preferences, according to some embodiments. Method 700 may correspond to a detailed embodiment of step 615 of method 600. As such, method 700 may be performed by clustering module 146 in some embodiments.

Partitioning method 700 begins in 710 by choosing a reference user 800 (see FIG. 8) from the group of users. In various embodiments, the reference user may be chosen at random or according to particular heuristics.

In 720, the method comprises calculating the centroid of preferences for users in the group. The centroid may correspond to an average set of preferences among the users in the group. For instance, if the average value for a given attribute among members of the group is 3, then the centroid includes the value 3 for that attribute. In various embodiments, the "average" may correspond without limitation to various collective mathematical measures, such as an arithmetic mean, geometric mean, median, weighted average, or other representations. In some embodiments, users who have no value for a given attribute may be omitted when calculating the centroid. The centroid may include any number of attributes, according to the attributes shared by the group.

Figure 8:
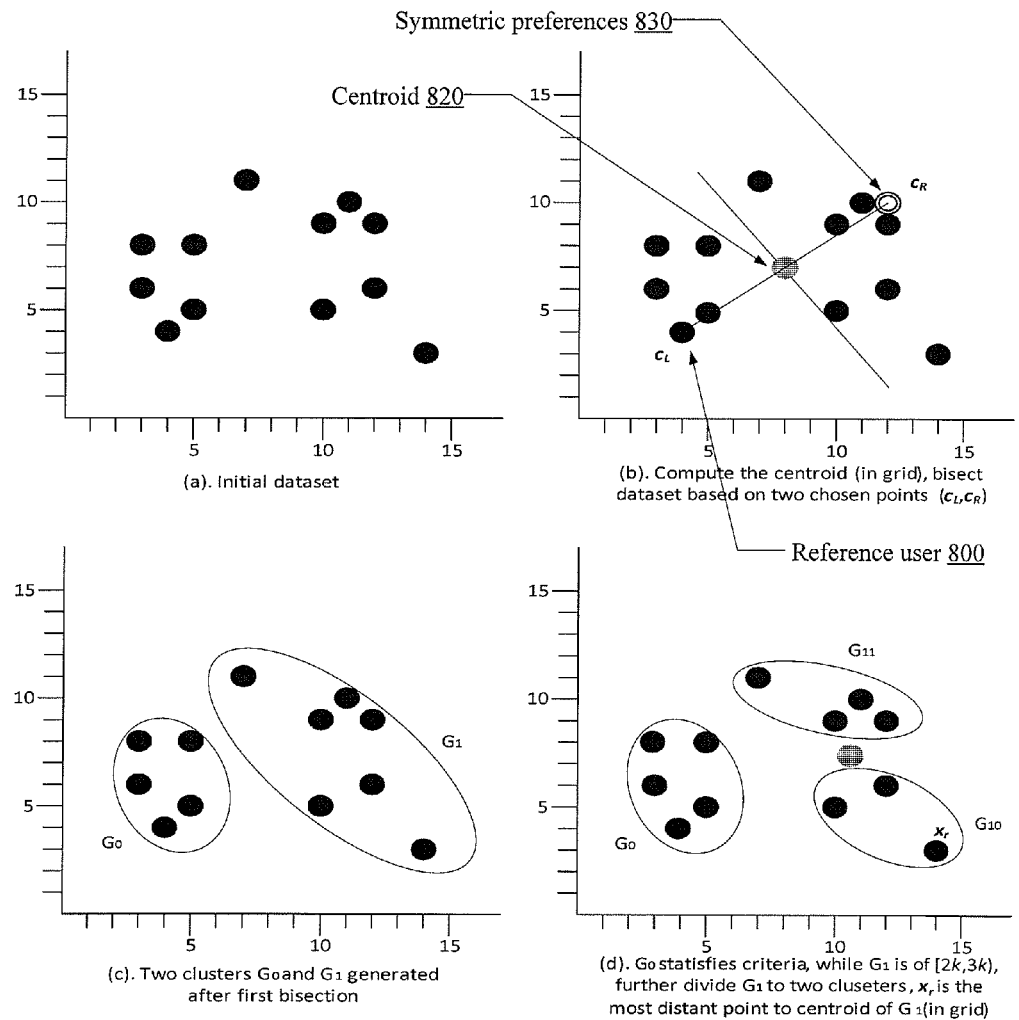
FIG. 8 is a graphical visualization of partitioning a group of users into two subgroups, such as by performing method 700.

In 730, the method comprises determining a symmetric set of preferences based on the reference user's preferences and the centroid preferences. Geometrically, the "symmetric" set of preferences corresponds to the reflection of the reference user about the centroid, as shown in FIG. 8. Consider a simplistic example where each user has only two attributes. If the reference user preferences are (4, 4) and the centroid preferences are (6, 6), then the symmetric set of preferences would be (8, 8).

In 740, the method comprises calculating a potential partitioning by assigning each user in the group to either a first subgroup or to a second subgroup, depending on whether the user's preferences are closer to those of the reference user or to those of the symmetric set of preferences. Thus, step 740 results in a partitioning of the group into two subgroups, where the users in each subgroup are similar to the other users in the subgroup.

In some embodiments, the method may comprise generating several potential partitionings and choose the best one. For example, in method 700, the method may repeat steps 710-740, as indicated by the feedback loop from 750 to 710, until some termination condition occurs. In various embodiments, the termination condition may vary. For example, in some embodiments, the method may comprise generating a set number of potential partitionings. In other embodiments, the method may continue generating partitionings until finding one that meets as given maximum error within a set number of maximum tries.

When enough possible partitionings have been generated, as indicated by the negative exit from 750, the method may comprise choosing the potential partitioning with lowest error. The error of a partitioning refers to the degree of dissimilarity between members of a proposed group. For example, the error of a group may be measured by a standard deviation from the group centroid or using any other mathematical measure (e.g., sum of squares error). The result of method 700 is therefore a partitioning of a given group into two separate groups of similar users, as recited in step 615 of method 600.

FIG. 8 is a graphical visualization of partitioning a group of users into two subgroups, such as by performing method 700. In (a), a group of users are represented by solid circles on a two-dimensional plot. The x and y coordinates on the two-dimensional plot may represent respective attribute values for each user.

In (b), reference user 800 is chosen (as in 710), centroid 820 is calculated (as in 720), and a symmetric set of preferences 830 is calculated (as in 730) based on reference user 800 and centroid 820. The space is then partitioned into area that is closer to the reference user and another area that is closer to the symmetric preferences. The space partitioning is shown by the bisecting line between reference user 800 and symmetric preferences 830.

As shown in (c), the users are partitioned into two groups, according to the partitioned space shown in (b). The partitioning may be repeated for any group that is too large, as in method 600. For example, group $G_1$ in (c) is partitioned into two more groups, as shown in (d), by repeating the partitioning method (i.e., picking a new reference user from the group, calculating a new centroid for the group, and determining a symmetric set of preference).

As discussed above, method 600 may be used to identify clusters of similar users where each one requires a fixed level of anonymity (i.e., fixed k-gather). However, in some embodiments, different users may prefer different levels of privacy. For example, some users may not require any privacy while others may require some arbitrary amount (i.e., k may vary for different users). The problem of finding a clustering with such constraints may be referred to as a "variable k-gather problem."

Figure 9:
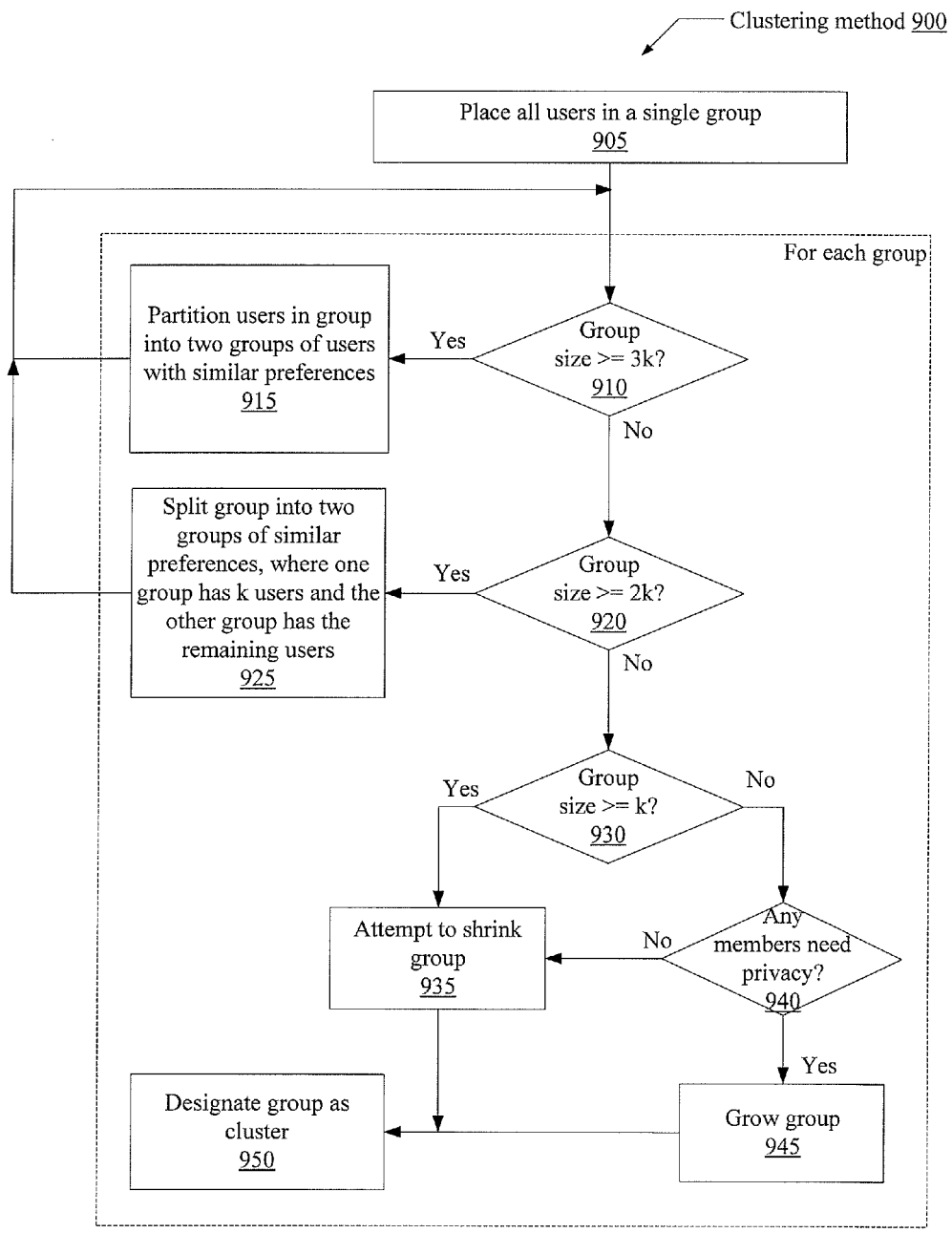
FIG. 9 is a flow diagram illustrating a method for identifying clusters of similar users with variable privacy preferences, according to some embodiments.

FIG. 9 is a flow diagram illustrating a method for identifying clusters of similar users with variable privacy preferences, according to some embodiments. Method 900 presumes that each user has one of two possible privacy needs: k or 1. That is, each user either requires k-anonymity or no anonymity. Accordingly, method 900 represents a heuristic method for solving a particular variable k-gather problem where each user requires either k-anonymity or no anonymity. Method 900 may correspond to clustering step 420 of FIG. 4 and may be performed by clustering module 146 in some embodiments.

Like method 600, method 900 operates by first placing all users in a single group (as in 905) and then applying a recursive method to the group, which may partition the group further until all groups are designated as clusters.

In 910, the method decides whether the group size is greater than or equal to 3k. If the group size is greater than or equal to 3k, as indicated by the affirmative exit from 910, then the method partitions the users in the group into two groups of users with similar preferences (as in 915). Step 915 may be analogous to step 615 of FIG. 6 and may therefore be accomplished by executing method 700 of FIG. 7. The recursive method may then be applied to the two subgroups, as indicated by the feedback loop from 915 to 910.

If the group size is not greater than or equal to 3k, as indicated by the negative exit from 910, the method proceeds to decision 920. In 920, the system determines whether the group size is greater than or equal to 2k. If the group size is greater than or equal to 2k, as indicated by the affirmative exit from 920, the system splits the group into two groups of similar preferences, as in 925, where one group has k users and the other group has the remaining users. Thus, the split of 925 results in two groups, one with k users and another with n users, where $k<=n<2k$. The recursive method may then be applied to the two newly created groups, as indicated by the feedback loop from 925 to 910.

If the group is not of size greater than or equal to 2k, as indicated by the negative exit from 920, the method moves to decision 930. In 930, the system decides whether the group size is greater than or equal to k (i.e., the minimum group size). If the group size is greater or equal to k, as indicated by the affirmative exit from 930, the system attempt to shrink the group, as in 935.

Attempting to shrink a group, as in 935, may comprise removing zero or more users who do not require privacy. If any member of the group requires privacy (i.e., k-anonymity), then step 935 will shrink the group at most to the minimum size of k. Otherwise, if no user requires privacy, then step 935 will shrink the group to size zero, effectively making each user its own entity. The remaining group is designated as a cluster in 950.

In some embodiments, the system may be configured shrink a group, as in 935, in a manner that achieves the lowest possible error for the resulting (shrunken) group. For example, if a group of size k+1 includes two users who do not require privacy, the system may remove either one of the two users. However, by removing the one user whose preferences are least like those of the other users in the group, the error in the resulting group is minimized. Recall that clusters with lower error may be desirable so that the resulting anonymized dataset more accurately reflects the original dataset.

If, in 930, the group size is not greater than or equal to k, as indicated by the negative exit from 930, execution proceeds to decision 940. In 940, the system determines whether any of the users in the group require privacy. If no group member requires privacy, as indicated by the negative exit from 940, then execution proceeds to 935 (attempt to shrink the group) where the group is broken out into individual users. However, if any members do need privacy, as indicated by the affirmative exit from 940, then the system may grow the group, as in 945. Once the group is of size k, it is designated as a cluster, as in 950.

Growing a group, as in 945, may comprise adding users to the group until the group is of size k. In some embodiments, to minimize the error of the resulting cluster, the system may add only the closest n neighbors to a group of size k−n. In some embodiments, users may be added from the group's complement group.

Feature Extraction

The result of the preprocessing and clustering phases described above is a set of user clusters, where each cluster contains user(s) with similar preferences. The data publisher would like to publish the anonymized recommender system (as opposed to the anonymized user preferences table). Therefore, for each cluster of users, the system may refer back to the original recommender system and anonymize the rating of each movie (e.g., as the average rating over users who have rated the movie). This process is referred to herein as feature extraction.

Figure 10:
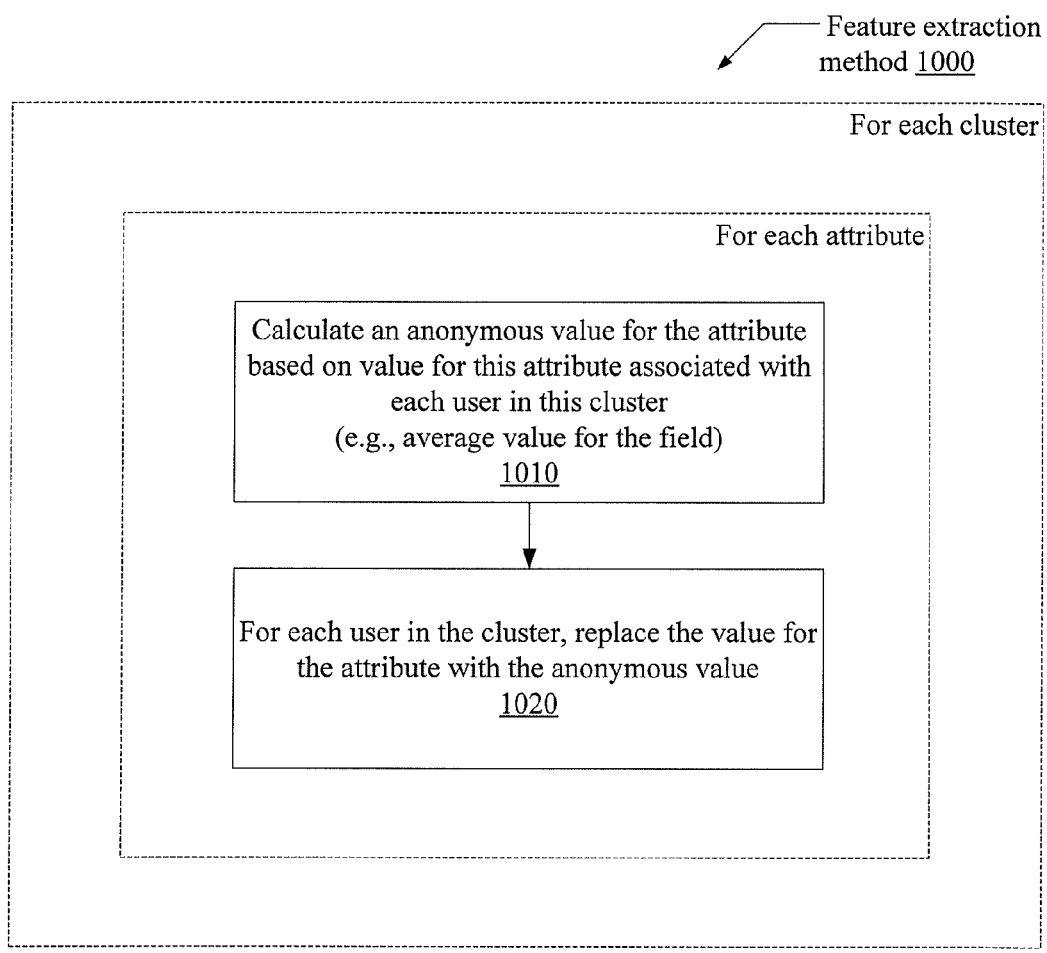
FIG. 10 is a flow diagram illustrating a method for performing feature extraction, according to some embodiments.

FIG. 10 is a flow diagram illustrating a method for performing feature extraction, according to some embodiments. Feature extraction method 1000 may correspond to step 430 of FIG. 4 and may therefore be performed by feature extractor 148 of FIG. 3.

According to the illustrated embodiment, feature extraction method 1000 iterates over every cluster and anonymizes that cluster. To anonymize a cluster, the method comprises iterating over each attribute and, in 1010, calculating an anonymous value for that attribute for the cluster of users. For example, the anonymous value may be an average value for that attribute among all users in the cluster. In various embodiments, any other collective mathematical measure may be used to reflect that values of that attribute across users in the cluster. In some embodiments, users who are not associated with a value for a given attribute may be ignored when calculating the collective measure (e.g., average) in 1010.

In 1020, the method iterates over each user in the cluster and replaces the user's personal value for the attribute with the collective "anonymous" value. In some embodiments, if a user did not previously have a value for the given attribute, the anonymous value may still be inserted so as to preserve anonymity.

Example Systems

Figure 11:
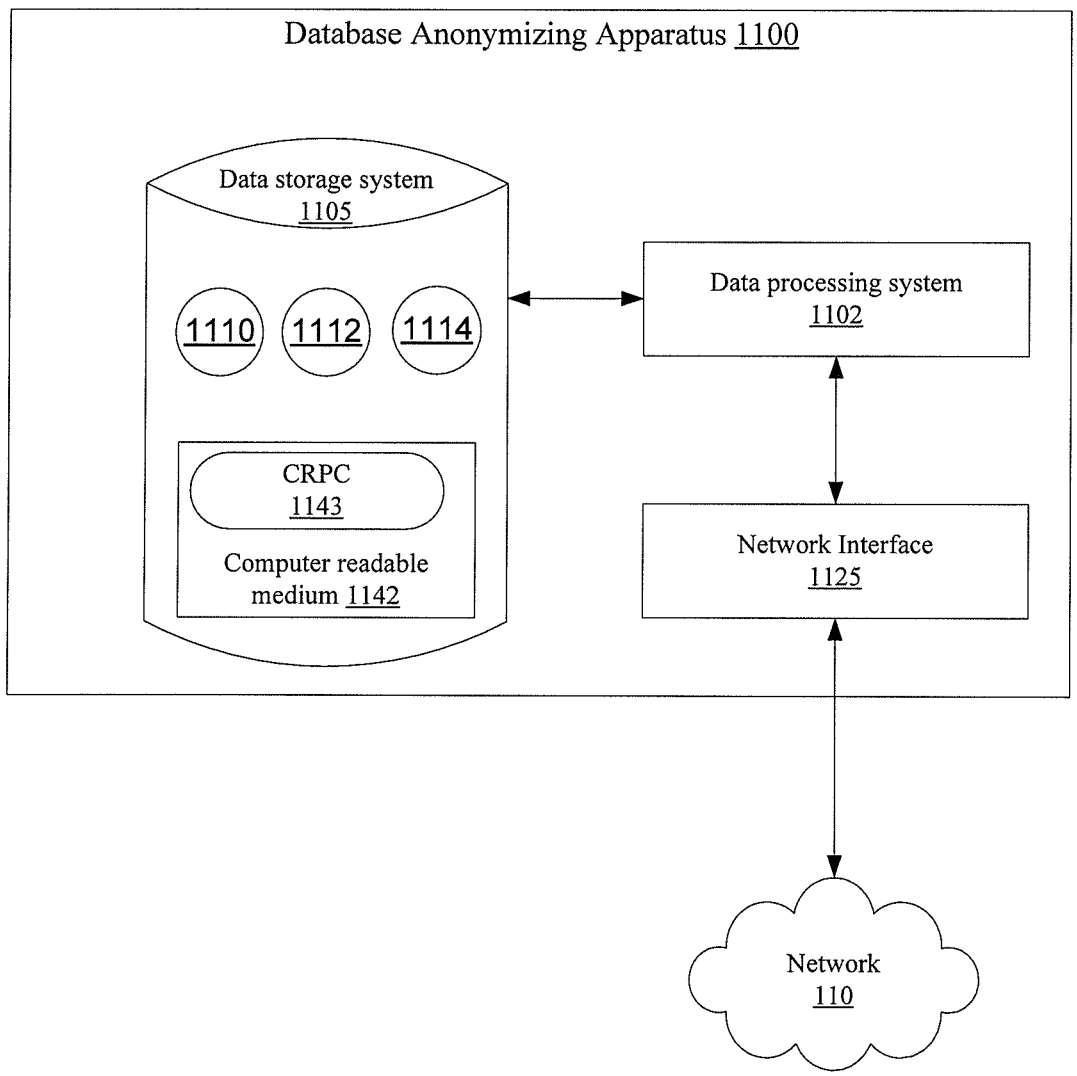
FIG. 11 illustrates a possible implementation for at least some components of a database anonymizing apparatus, according to some embodiments.

FIG. 11 illustrates a possible implementation for at least some components of a database anonymizing apparatus, according to some embodiments. As shown in FIG. 11, database anonymizing apparatus 1100 may include: a data processing system 1102, which may include one or more data processing devices each having one or more microprocessors and/or one or more circuits, such as an application specific integrated circuit (ASIC), Field-programmable gate arrays (FPGAs), etc; a network interface 1125 for receiving messages and transmitting messages; a data storage system 1105, which may include one or more computer-readable mediums, such as non-volatile storage devices and/or volatile storage devices (e.g., random access memory (RAM)). As shown in FIG. 11, data storage system 1105 may be used to store a non-anonymized database 1110, non-anoymized dataset 1112, and/or various other intermediate data structures.

In embodiments where data processing system 1102 includes a microprocessor, a database anonymizing computer program product is provided, which includes computer readable program code 1143. Program code 1143 may implement a computer program, which may be stored on a computer readable medium 1142. Storage medium 1142 may include, but is not limited to, magnetic media (e.g., a hard disk), optical media (e.g., a DVD), memory devices (e.g., random access memory), etc. In some embodiments, computer readable program code 1143 may be configured such that, when executed by data processing system 1102, code 1143 causes the processing system to perform steps described above (e.g., steps describe above with reference to the flow charts shown in FIGS. 4-10).

In some embodiments, database anonymizing apparatus 1100 may be configured to perform steps described above without the need for code 1143. For example, data processing system 1102 may include specialized hardware, such as one or more application-specific integrated circuits (ASICs). Hence, the features of the present invention described above may be implemented in hardware and/or software. For example, in some embodiments, the functional components of the database anonymizing system described above may be implemented by data processing system 1102 executing computer instructions 1143, by data processing system 1102 operating independent of any computer instructions 1143, or by any suitable combination of hardware and/or software.

Figure 12:
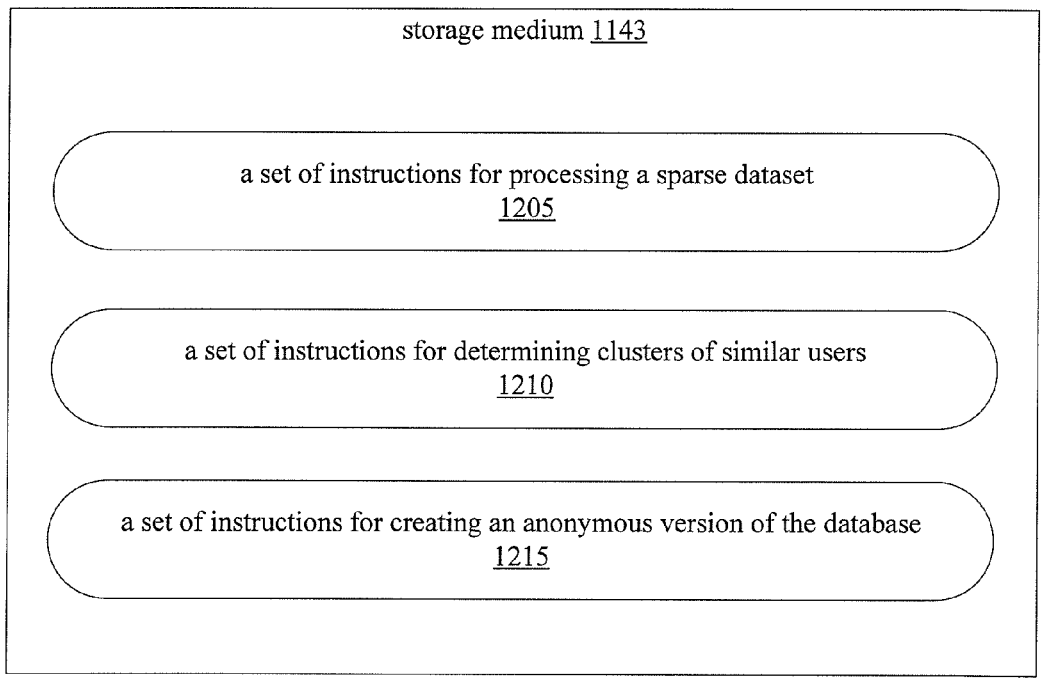
FIG. 12 illustrates an embodiment of a computer readable program code (CRPC) 1143.

FIG. 12 illustrates an embodiment of a computer readable program code (CRPC) 1143. In the embodiment shown, CRPC 1143 includes (1) a set of instructions 1205 for preprocessing a sparse data set to reduce dimensionality and/or sparseness, as described here, (2) a set of instructions 1210 for determining clusters of users (e.g., to solve the fixed or variable k-gather problem) as described herein, and (3) a set of instructions 1215 for extracting features from each cluster, as described herein.

Though various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for anonymizing a dataset that correlates a set of entities with respective attributes, the method comprising:
determining, by one or more processors on one or more computers, clusters of similar entities from the dataset, wherein the determining comprises:
the one or more processors partitioning the set of entities into a first group of entities with similar attributes to one another and a complement group of entities with similar attributes to one another, wherein the partitioning comprises:
the one or more processors choosing a reference entity from the set of entities;
the one or more processors determining a symmetric set of attributes based on the reference entity's attributes and on an average of the attributes of the set of entities being partitioned, wherein the average of the attributes of the set of entities being partitioned is calculated as a centroid of the attributes, and wherein the symmetric set of attributes of a reference entity is determined as a reflection of attributes of the reference entity about the centroid; and
the one or more processors assigning each entity to the first group or to the complement group depending on whether the entity's attributes are more similar to those of the reference entity or to those of the symmetric set of attributes respectively;
identifying, by the one or more processors, the clusters of similar entities by recursively repeating the partitioning on the first group and on the complement group until every group meets one or more size criteria; and
creating, by the one or more processors, an anonymous version of the dataset, wherein creating the anonymous version comprises:
the one or more processors calculating, for one of the clusters of similar entities, an anonymous value for a given attribute; and
the one or more processors assigning the anonymous value of the attribute to each entity in the cluster.

2. The method of claim 1, further comprising: before identifying the clusters, preprocessing the dataset by the one or more processors, wherein the preprocessing comprises performing a singular-value decomposition on the dataset.

3. The method of claim 2, wherein the preprocessing comprises:
factoring a matrix containing the entity data into a diagonal matrix of singular values;
setting the singular values in descending order; and
choosing the r most significant singular values with which to identify the clusters.

4. The method of claim 1, wherein the clustering is dependent on a per-entity privacy policy indicating, for a given entity, a minimum size of a cluster to which the entity may be assigned.

5. The method of claim 1, wherein the one or more size criteria include a minimum size threshold for each group.

6. The method of claim 5, wherein the minimum size for a given group is dependent on one or more per-entity privacy policies associated with one or more entities in the group.

7. The method of claim 1, further comprising:
in response to determining that the number of entities in a given group is between two and three times the minimum threshold, dividing the given group into two groups, wherein the number of entities in each of the two groups meets the minimum threshold.

8. The method of claim 1, further comprising:
in response to determining that the number of entities in an under-populated group is below a minimum threshold, growing the under-populated group by reassigning to the under-populated group one or more entities from the under-populated group's complement group until the number of entities in the under-populated group meets the minimum threshold.

9. The method of claim 8, wherein growing the under-populated group comprises:
identifying an entity in the complement group whose attributes are most similar to those of the under-populated group;
reassigning the identified entity from the complement group to the under-populated group; and
repeating the determining and assigning until the number of entities in the under-populated group meets the minimum threshold.

10. The method of claim 1, wherein identifying the clusters of entities further comprises:
determining that no entity in a given group requires anonymity, wherein the determining is based on respective privacy policies of the entities; and
in response to determining that no entity in the given group requires anonymity, placing each entity in a separate, one-entity cluster.

11. The method of claim 1, wherein identifying the clusters of entities further comprises: in response to determining that a given group includes more entities than a given threshold, identifying an entity in the group that does not require privacy; and removing the entity from the group.

12. A non-transitory computer readable storage medium storing program instructions executable by one or more processors on one or more computers to determine clusters of similar entities from a set of entities by:
partitioning the set of entities into a first group of entities with similar attributes to one another and a complement group of entities with similar attributes to one another, wherein the program instructions cause the computer to perform the partitioning by:
choosing a reference entity from the set of entities;
determining a symmetric set of attributes based on the reference entity's attributes and on an average of the attributes of the set of entities being partitioned, wherein the average of the attributes of the set of entities being partitioned is calculated as a centroid of the attributes, and wherein the symmetric set of attributes of a reference entity is determined as a reflection of attributes of the reference entity about the centroid; and
assigning each entity to the first group or to the complement group depending on whether the entity's attributes are more similar to those of the reference entity or to those of the symmetric set of attributes respectively;
identifying the clusters of similar entities by recursively repeating the partitioning on the first group and on the complement group until every group meets one or more size criteria; and
creating an anonymous version of the dataset, wherein creating the anonymous version comprises:
calculating, for one of the clusters of similar entities, an anonymous value for a given attribute; and
assigning the anonymous value of the attribute to each entity in the cluster.

13. The medium of claim 12, wherein the program instructions are further executable to implement: before identifying the clusters, preprocessing the dataset to reduce dimensionality or sparseness.

14. The medium of claim 13, wherein the preprocessing comprises performing a singular-value decomposition on the dataset.

15. The medium of claim 12, wherein the one or more size criteria include a minimum size threshold for each group, wherein the minimum size for a given group is dependent on one or more per-entity privacy policies associated with one or more entities in the group.

16. An apparatus comprising:
one or more processors,
memory coupled to the one or more processors, wherein the memory stores program instructions executable by the one or more processors to determine clusters of similar entities from a set of entities by:
partitioning the set of entities into a first group of entities with similar attributes to one another and a complement group of entities with similar attributes to one another, wherein the instructions, when executed by the one or more processors, causes the processor to perform the partitioning by:
choosing a reference entity from the set of entities;
determining a symmetric set of attributes based on the reference entity's attributes and on an average of the attributes of the set of entities being partitioned, wherein the average of the attributes of the set of entities being partitioned is calculated as a centroid of the attributes, and wherein the symmetric set of attributes of a reference entity is determined as a reflection of attributes of the reference entity about the centroid; and
assigning each entity to the first group or to the complement group depending on whether the entity's attributes are more similar to those of the reference entity or to those of the symmetric set of attributes respectively;
identifying the clusters of similar entities by recursively repeating the partitioning on the first group and on the complement group until every group meets one or more criteria; and
creating an anonymous version of the dataset, wherein creating the anonymous version comprises:
calculating, for one of the clusters of similar entities, an anonymous value for a given attribute; and
assigning the anonymous value of the attribute to each entity in the cluster.

17. The apparatus of claim 16, wherein the program instructions are further executable to implement: before identifying the clusters, processing the dataset to reduce dimensionality or sparseness.

* * * * *